United States Patent
Botea et al.

(10) Patent No.: US 11,017,038 B2
(45) Date of Patent: May 25, 2021

(54) IDENTIFICATION AND EVALUATION WHITE SPACE TARGET ENTITY FOR TRANSACTION OPERATIONS

(71) Applicant: INTERNATIONAL BUSINESS MACHINES CORPORATION, Armonk, NY (US)

(72) Inventors: Adi I. Botea, Dublin (IE); Alice J. Chang, New York City, NY (US); Elizabeth Daly, Dublin (IE); Raymond Lloyd, Navan (IE); Xiaoxi Tian, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 587 days.

(21) Appl. No.: 15/719,944

(22) Filed: Sep. 29, 2017

(65) Prior Publication Data
US 2019/0102462 A1 Apr. 4, 2019

(51) Int. Cl.
*G06F 16/9535* (2019.01)
*G06Q 50/00* (2012.01)
*H04L 29/08* (2006.01)

(52) U.S. Cl.
CPC ......... *G06F 16/9535* (2019.01); *G06Q 50/01* (2013.01); *H04L 67/306* (2013.01)

(58) Field of Classification Search
CPC ... G06F 16/9535; G06Q 50/01; H04L 67/306; H04L 67/10
See application file for complete search history.

(56) References Cited

U.S. PATENT DOCUMENTS

| | | | |
|---|---|---|---|
| 5,701,460 A | 12/1997 | Kaplan et al. | |
| 5,752,241 A | 5/1998 | Cohen | |
| 6,021,372 A | 2/2000 | Harrington | |
| 7,069,235 B1* | 6/2006 | Postelnik | G06Q 10/087 705/26.81 |
| 7,076,483 B2 | 7/2006 | Preda et al. | |
| 7,512,612 B1 | 3/2009 | Akella et al. | |

(Continued)

FOREIGN PATENT DOCUMENTS

| | | |
|---|---|---|
| CN | 102722569 A | 10/2012 |
| CN | 103049431 A | 4/2013 |

(Continued)

OTHER PUBLICATIONS

List of IBM Patents or Patent Applications Treated as Related dated Oct. 3, 2017 (2 pages).

(Continued)

*Primary Examiner* — Cam Y T Truong
(74) *Attorney, Agent, or Firm* — Griffiths & Seaton PLLC

(57) ABSTRACT

Embodiments for identifying and evaluating white space target entities by a processor. Data may be collected from a knowledge domain relating to a plurality of entities and text data extracted from one or more data sources. An enterprise social network graph may be created having one or more nodes relating to the collected data. The one or more nodes in the enterprise social network graph may be ranked. One or more potential target nodes may be recommended to a selected node as a candidate for establishing a potential relationship according to the ranking.

9 Claims, 13 Drawing Sheets

(56) References Cited

U.S. PATENT DOCUMENTS

| | | | |
|---|---|---|---|
| 7,644,052 B1 | 1/2010 | Chang et al. | |
| 8,001,152 B1 | 8/2011 | Solan | |
| 8,484,197 B2 | 7/2013 | Tokai | |
| 8,655,989 B2 | 2/2014 | Ritter et al. | |
| 8,736,612 B1 | 5/2014 | Goldman et al. | |
| 2005/0198073 A1 | 9/2005 | Becks et al. | |
| 2006/0074858 A1 | 4/2006 | Etzold et al. | |
| 2006/0248093 A1 | 11/2006 | Lassila et al. | |
| 2007/0214179 A1* | 9/2007 | Hoang | G06F 16/2428 |
| 2008/0218519 A1 | 9/2008 | Coury et al. | |
| 2008/0243811 A1 | 10/2008 | He et al. | |
| 2009/0024962 A1 | 1/2009 | Gotz | |
| 2009/0240680 A1 | 9/2009 | Tankovich et al. | |
| 2010/0131251 A1 | 5/2010 | Suzuki | |
| 2010/0313157 A1 | 12/2010 | Carlsson et al. | |
| 2011/0040717 A1 | 2/2011 | Rho et al. | |
| 2011/0106526 A1 | 5/2011 | Nguyen et al. | |
| 2012/0023085 A1 | 1/2012 | Bellerive et al. | |
| 2012/0046992 A1 | 2/2012 | Hu et al. | |
| 2012/0059767 A1 | 3/2012 | Uthmann | |
| 2012/0158639 A1 | 6/2012 | Moore et al. | |
| 2012/0197834 A1 | 8/2012 | Panigrahy et al. | |
| 2012/0254153 A1 | 10/2012 | Abraham et al. | |
| 2013/0080461 A1 | 3/2013 | Byrne et al. | |
| 2013/0124538 A1* | 5/2013 | Lee | H04L 63/105 707/749 |
| 2013/0132369 A1 | 5/2013 | Delling et al. | |
| 2013/0218899 A1* | 8/2013 | Raghavan | G06F 16/3328 707/741 |
| 2013/0254213 A1* | 9/2013 | Cheng | G06Q 50/01 707/748 |
| 2014/0136547 A1 | 5/2014 | Nagar et al. | |
| 2014/0214945 A1 | 7/2014 | Zhang et al. | |
| 2014/0337306 A1 | 11/2014 | Gramatica | |
| 2016/0078148 A1 | 3/2016 | Werneck et al. | |
| 2016/0203130 A1 | 7/2016 | Roque et al. | |
| 2017/0053347 A1* | 2/2017 | Lipshitz | G06Q 40/025 |
| 2017/0330096 A1* | 11/2017 | Das Gupta | G06F 11/0769 |
| 2018/0025093 A1* | 1/2018 | Xia | G06F 16/90335 707/602 |
| 2018/0081880 A1* | 3/2018 | Kennedy | G06F 16/951 |
| 2018/0268063 A1* | 9/2018 | Pawar | G06F 16/9024 |

FOREIGN PATENT DOCUMENTS

| | | |
|---|---|---|
| WO | 2004088475 A2 | 10/2004 |
| WO | 2013127951 A1 | 9/2013 |

OTHER PUBLICATIONS

Kazienko et al., "New business client acquisition using social networking sites," Springerlink.com, Electron Markets 23, Feb. 27, 2013 (11 pages).

Franz et al., "TripleRank: Ranking Semantic Web Data by Tensor Decomposition," (Eds.): ISWC 2009, LNCS 5823, pp. 213-228, 2009.

Gao et al., "Semi-Supervised Ranking on Very Large Graphs with Rich Metadata," KDD'11, pp. 96-104, San Diego, Aug. 21-24, 2011.

Gueffaz et al., "Temporal Logic to Query Semantic Graphs Using the Model Checking Method," Journal of Software, vol. 7, No. 7, pp. 1462-1472, Jul. 2012.

Halaschek et al., "Discovering and Ranking Semantic Associations over a Large RDF Metabase," Proceedings of the 30th VLDB Conference, Toronto, pp. 1317-1320, 2004.

Lofgren et al., "Personalized PageRank to a Target Node," arXiv:1304.4658v2[cs.DS], Apr. 11, 2014.

Montanelli et al., "Semantically routing queries in peer-based systems: the H-Link approach," The Knowledge Engineering Review, vol. 23:1, pp. 51-72, 2008.

"Centrality—Wikipedia, the free encyclopedia," <http://en.wikipedia.org/w/index.php?title=Centrality&oldid=573217225>, Sep. 16, 2013.

"Eigenvalues and eigenvectors—Wikipedia, the free encyclopedia," <http://en.wikipedia.org/w/index.php?title=Eignvalue_and_eigenvectors&oldid=573428962>, Sep. 18, 2013.

"Google PageRank—Algorithm," <http://pr.efactory.de/e-pagerank-algorithm.shtml>, [retrieved on Apr. 24, 2014].

"HITS algorithm—Wikipedia, the free encyclopedia," <http://en.wikipedia.org/w/index.php?title=HITS_algorithm&oldid=573428962>, Apr. 21, 2013.

"Random Surfer," 1.6 Case Study: Random Surfer, <http://introcs.cs.princeton.edu/lectures/16pagerank-2x2.pdf>, Apr. 24, 2014.

* cited by examiner

600

RANKING CONNECTIVITY BETWEEN NODES

TABLE 1

|  | ID | SCORE | RANK |
|---|---|---|---|
| COMPANY E | 879 | 0.0179 | 19 |
| COMPANY D | 881 | 0.0179 | 20 |
| COMPANY A | 652 | 0.000020 | 754 |
| COMPANY F | 829 | 0.000015 | 829 |

PEOPLE NODES

COMPANY NODES

TARGET NODES

825

JANE DOE 1

- CURRENT POSITION: DIRECTOR AT THE BOARD

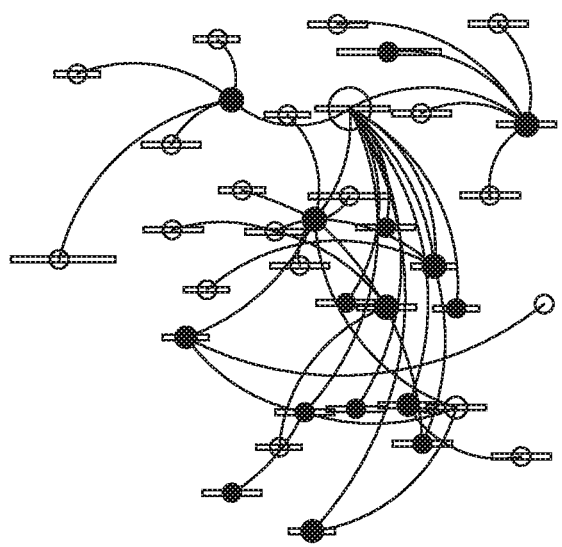

- *PAST POSITION*: CEO, COMPANY E GROUP

| | |
|---|---|
| NO. OF WON OPPTYS IN LAST 5 YEARS: | 4 |
| NO. OF LOST OPPTYS IN LAST 5 YEARS: | 18 |
| VALUE OF WON OPPTYS IN LAST 5 YEARS ($M): | 0.21 |
| VALUE OF LOST OPPTYS IN LAST 5 YEARS ($M): | 0.53 |

- *PAST POSITION*: SENIOR MANAGER, COMPANY D GROUP

| | |
|---|---|
| NO. OF CURRENT VALIDATED OPPTYS: | 163 |
| VALUE OF CURRENT VALIDATED OPPTYS ($M): | 178.73 |
| NO. OF WON OPPTYS IN LAST 5 YEARS: | 2310 |
| NO. OF LOST OPPTYS IN LAST 5 YEARS: | 2367 |
| VALUE OF WON OPPTYS IN LAST 5 YEARS ($M): | 1639.31 |
| VALUE OF LOST OPPTYS IN LAST 5 YEARS ($M): | 2876.37 |

FIG. 8B

IDENTIFICATION AND EVALUATION WHITE SPACE TARGET ENTITY FOR TRANSACTION OPERATIONS

CROSS REFERENCE TO RELATED APPLICATIONS

This application is a related to U.S. patent application Ser. No. 14/520,741 filed on Oct. 22, 2014 the contents of which are incorporated herein.

BACKGROUND OF THE INVENTION

Field of the Invention

The present invention relates in general to computing systems, and more particularly to, various embodiments for identifying and evaluating white space target entities for transaction operations by a processor.

Description of the Related Art

In today's interconnected and complex society, computers and computer-driven equipment are more commonplace. Processing devices, with the advent and further miniaturization of integrated circuits, have made it possible to be integrated into a wide variety of devices. Due to the recent advancement of information technology and the growing popularity of the Internet, a vast amount of information is now available in digital form. Such availability of information or data has provided many opportunities.

As the technology field grows exponentially each year and ever-growing amounts of data are stored, retrieved, and accessed on computing systems, the need to deliver accurate and applicable data becomes increasingly paramount. Consequently, the need for advancement in a computing system capable of recommending relevant and accurate information is of great precedence.

SUMMARY OF THE INVENTION

Various embodiments for identifying and evaluating white space target entities for transaction operations by a processor, are provided. In one embodiment, by way of example only, a method for identifying and evaluating white space target entities for a sales operation by a processor is provided. Data may be collected from a knowledge domain relating to a plurality of entities and text data extracted from one or more data sources. An enterprise social network graph may be created having one or more nodes relating to the collected data. The one or more nodes in the enterprise social network graph may be ranked. One or more potential target nodes may be recommended to a selected node as a candidate for establishing a potential relationship according to the ranking.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 8A-8B are diagrams depicting various uses of an enterprise social network graph in which aspects of the present invention may be realized;

DETAILED DESCRIPTION OF THE DRAWINGS

Figure 1:
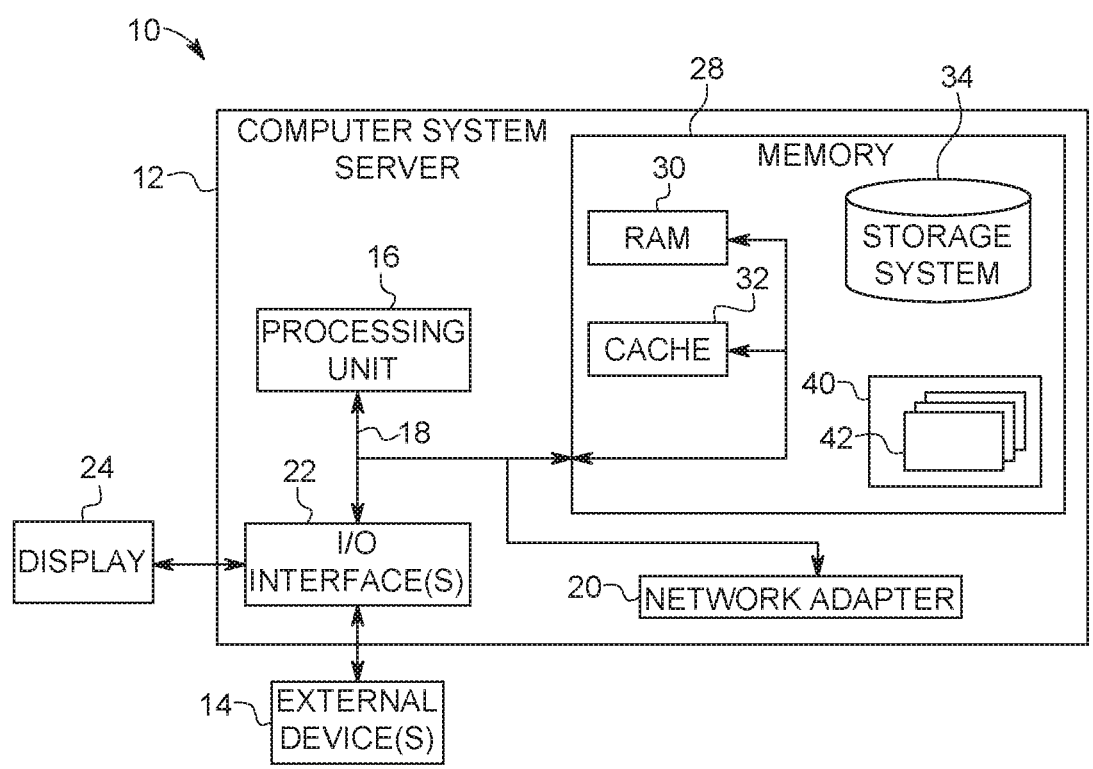
FIG. 1 is a block diagram depicting an exemplary computing node according to an embodiment of the present invention.

The advancement of computing storage and computational power provide the ability to collect large amounts of data, particularly for various types of data relating to businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within the economic or business environment.

More specifically, improving productivity, effectiveness, and opportunities of a business, organization, or government entity can be an effective operational strategy to drive revenue growth and manage bottom-line expenses. In one aspect, an entity or "enterprise entity" includes, but is not limited to: a private organization (e.g., bank, private company, etc.), a public organization (e.g., public school, government, police/fire department, post office, etc.), non-profit organization, a person, a product, a transaction, etc. Sales productivity, effectiveness, and opportunity are among critical issues for most companies, especially those with a large sales force (e.g., more than 1,000 sales representatives) and client-oriented organizations (e.g., consulting companies, insurance companies, software and hardware manufacturers, etc.).

Business leaders, managers, sales representatives, or executives (e.g., senior executives) often move from one corporation to another and therefore influence the "mindset"

with respect to certain products or vendors. Also, relationships between business leaders, managers, sales representatives, or executives and clients also carry important additional information that can be used to make the business/sales process more effective/efficient and improve its outcome. For example, sales representatives who have more experience selling to a certain client (company) are typically more effective in selling to that client again. A senior executive responsible for approving all business contracts for the purchase of goods or services may also be a key target executive for a particular vendor to develop a business relationship upon transitioning from one company to another by the senior executive. These business leaders, managers, sales executives, or senior level executives often times play critical roles in the ability of an entity to develop, maintain, or acquire business relationships (e.g., vendor-client relationship). Being able to identify and develop new business and sales opportunities while preserving existing vendor-client relationships is critical to the longevity of an entity.

Thus, an extensive network, along with solid personal relationships with decision-makers at a vendor/client company (e.g., worked together, went to school together, board/club memberships, etc.), enables increased opportunity and chances for success in making a sale with that client. In other words, social relationships and experiences play an important role in the sales process, yet none of the aforementioned approaches incorporate social information in arriving at a final decision or recommendation for identifying white space clients for sales opportunities. On the other hand, there have been a lot of activities in a field of social networking and social media, e.g., Facebook™, LinkedIn®, internal corporate social networks, etc. However, all these social networking and social medias have been used as a vehicle for connecting people, staying in touch, and getting better visibility into communities that share similar interests/characteristics without being predictive/prescriptive and without an ability to generate insights (automatically) that can be leveraged to drive sales strategy and enablement.

Thus, the preset invention relates to evaluating and analyzing one or more client entities and enterprise entities (e.g., businesses, organizations, or governments) to enable the enterprise entities to recommend new goods or services, prioritize current and potential client entities, manage relationships between individual entities (e.g., persons) or other enterprise entities, and identify potential client entities for creating sales opportunities while also providing contextual information that may support ranking, prioritizing, and recommending of the potential client entities. The present invention also provides solutions for identifying client entities which may lead to increased business opportunities, business strategies, business productivity, identifying how a particular client entity or individual entity is connected to the enterprise entity, or a combination thereof.

In one aspect, the present invention provides for a type of sales presentation or response to an existing or potential client. In additional aspects, the present invention evaluates and identifies key, target clients (e.g., business leaders, managers, sales representatives, or executives) for developing, building, and maintaining a business relationship. Targeted client entities are also identified as key client entities for increased sales opportunities based on previous sales or business type transactions. Business leaders, managers, sales representatives, or executives may also be evaluated and identified for having one or more connections or relationships to a particular entity. An enterprise social network graph may be created having one or more nodes, which may represent an entity and social relationship networks and relationships (or lack of social relationship networks and relationships) between each node in the enterprise social network graph.

The present invention also provides for identifying and evaluating white space target entities for a sales operation or opportunity by a processor. Data may be collected from a knowledge domain relating to a plurality of entities and text data extracted from one or more data sources. An enterprise social network graph may be created having one or more nodes relating to the collected data. The one or more nodes in the enterprise social network graph may be ranked. One or more potential target nodes may be recommended to a selected node as a candidate for establishing a potential relationship according to the ranking. In one aspect, the enterprise social network graph may include data that may be processed using natural language processing (NLP) operations. The enterprise social network graph may also be provided to a graphical user interface (GUI) (e.g., an interactive GUI) of a computing device. In other words, the present invention cognitively recommends, suggests, or predicts an identified target node as a candidate for establishing a potential relationship according to the ranking of each node in the enterprise social network graph.

In an additional aspect, various embodiments described herein provide for automatically identifying, ranking and recommending new clients to an organization for a sales operation by creating a client network graph. Details of each client may be collected using an organizational database of clients (e.g., existing and/or potential clients) such as, for example, a number of past transaction operations (e.g., sales agreement/contract, purchase of goods or services, etc.) between clients and the organization, a number of opportunities won/lost by the client, and/or movement (e.g., transfer or job relocation) of business leaders (e.g., senior staff personnel, officers, board of directors, etc.) of an organization/client (displayed in the client network graph) from one client company to another. The client network graph may be collected using the collected client details and displaying each detail as nodes in the graph. A most likely/new client may be recommended to the organization by ranking nodes/clients in the client network graph based on analysis of the connectivity score of known business leaders of one of the clients/organizations displayed in the client network graph with the organization.

In one aspect, white space or "whitespace" is any identified business opportunity (e.g., a "transactional operation" such as a sales opportunity or vendor-client relationship). A whitespace may also be where unmet and unarticulated needs are uncovered to create innovation opportunities. Whitespace may also include new or upgraded products and services that may be sold or products or services that do not exist. Whitespace may be opportunities identified for one or more entities of existing businesses, entities searching for increased growth opportunities, or companies wanting to explore strategic diversification (Virgin extending the brand into insurance and banking). Thus, a white space client or "whitespace target entity" is an identified client or entity with whom a business opportunity may be available and any new openings or opportunities untouched by competitors, or it can be considered part of what was traditionally deemed a remote, different industry or outside the boundaries of the firm. White space may also include outcome(s) of customer inquiries and the discovery process, that leads to new profit growth opportunities by defining potential gaps in existing markets. The process can be used to identify entirely new markets or it can be used to map incremental innovation in products or services. It can also be a new source of customer value that can be translated to economic value.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, websites, online journals, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
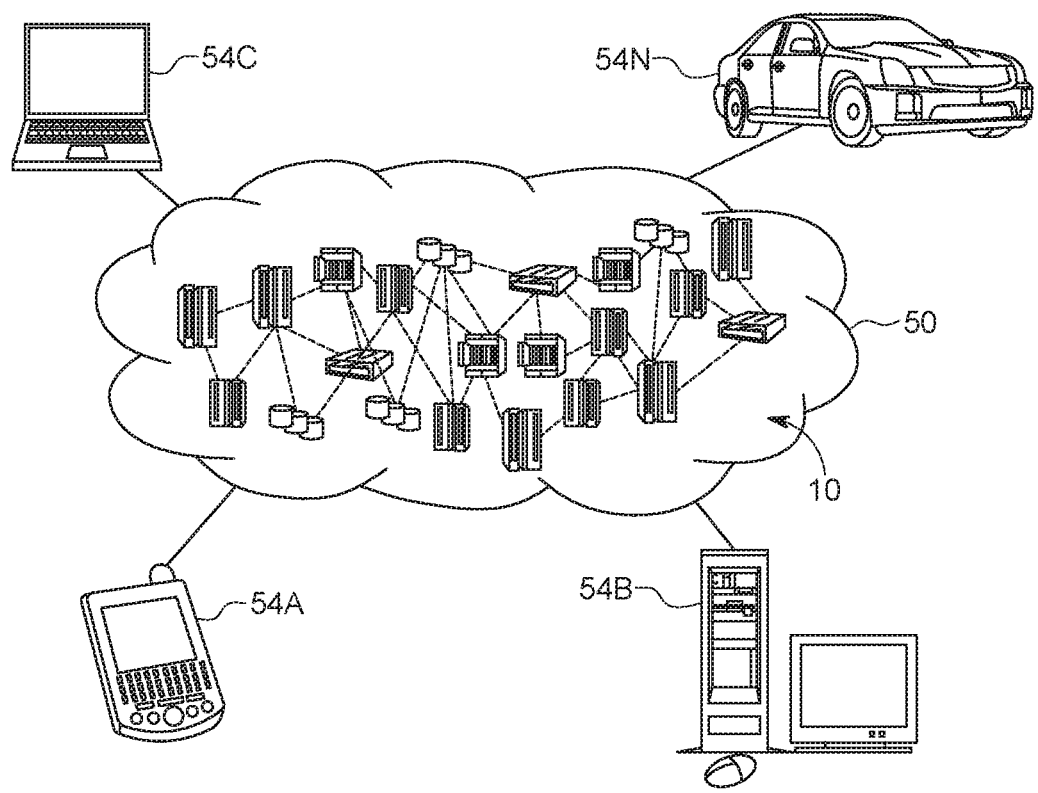
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
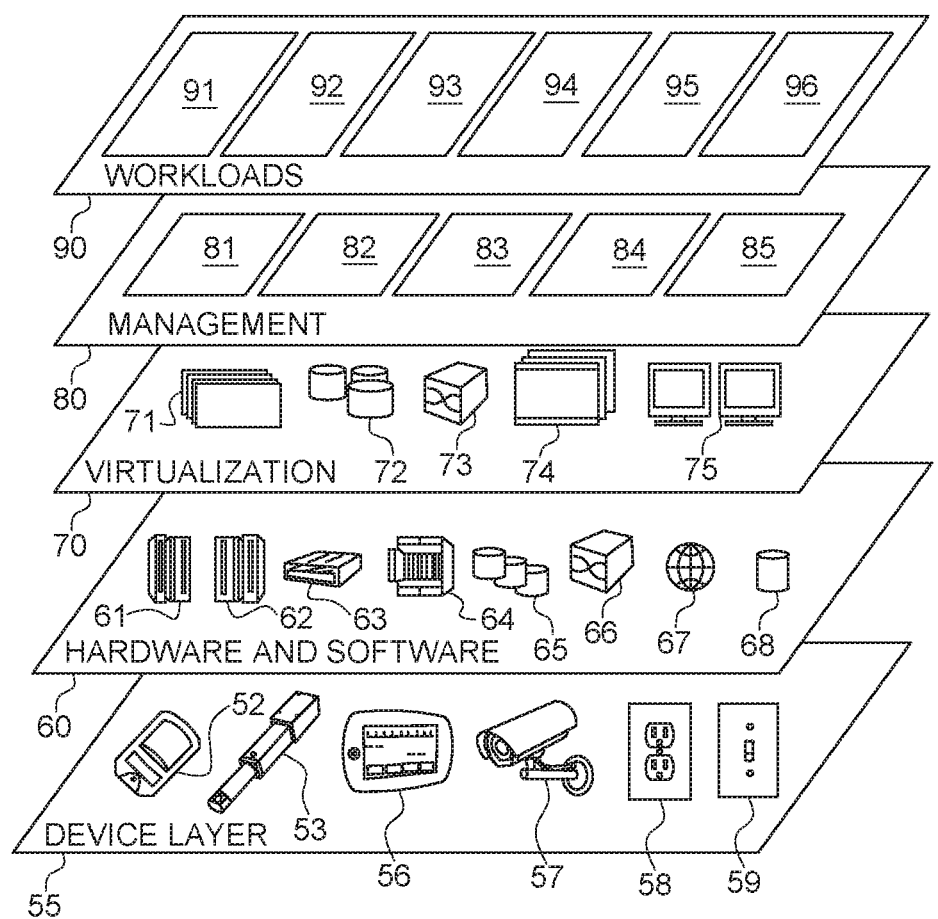
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various white space target entity identification and recommendation workloads and functions 96. In addition, white space target entity identification and recommendation workloads and functions 96 may include such operations as data analysis (including data collection and processing from various environmental sensors), and predictive data analytics functions. One of ordinary skill in the art will appreciate that the white space target entity identification and recommendation workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As described herein, the present invention may collect or receive text data that mentions people and organizations (e.g., an executive biography mentioning where the executive previously worked or company news related content such as "John Doe" recently joins Company A). A database (having a knowledge domain) may be used that contains existing clients and sales opportunities where a sales opportunity has: a business or sales team, names of clients of a selected business, a client identifier/identification ("ID"), a client business unit, location data of a client, client business domains, opportunity business domains, products of interest to a particular entity/client, identified transaction operation opportunities (e.g., sales opportunities), outcome(s) of transaction operation opportunity including dollar value and a status of the opportunity such as, for example, success, failure, or open/available status.

Using the collected data along with data from the database, the present invention may create a social network graph connecting business leaders, managers, sales representatives, executives, employees, companies and, optionally, contextual nodes such as products previously purchased, business category, and internal employees who previously worked with the clients. The resulting social graph may be used to: 1) prioritize future clients based on ones predicted to most likely convert to new clients, 2) recommend new products to the new client based on their proximity in the social graph, 3) identify the business category, 4) indicate or identify people in organizations/entities that are most important when approaching a new client, and 5) indicate or identify internal employees who are the most important when approaching the new client.

Figure 4:
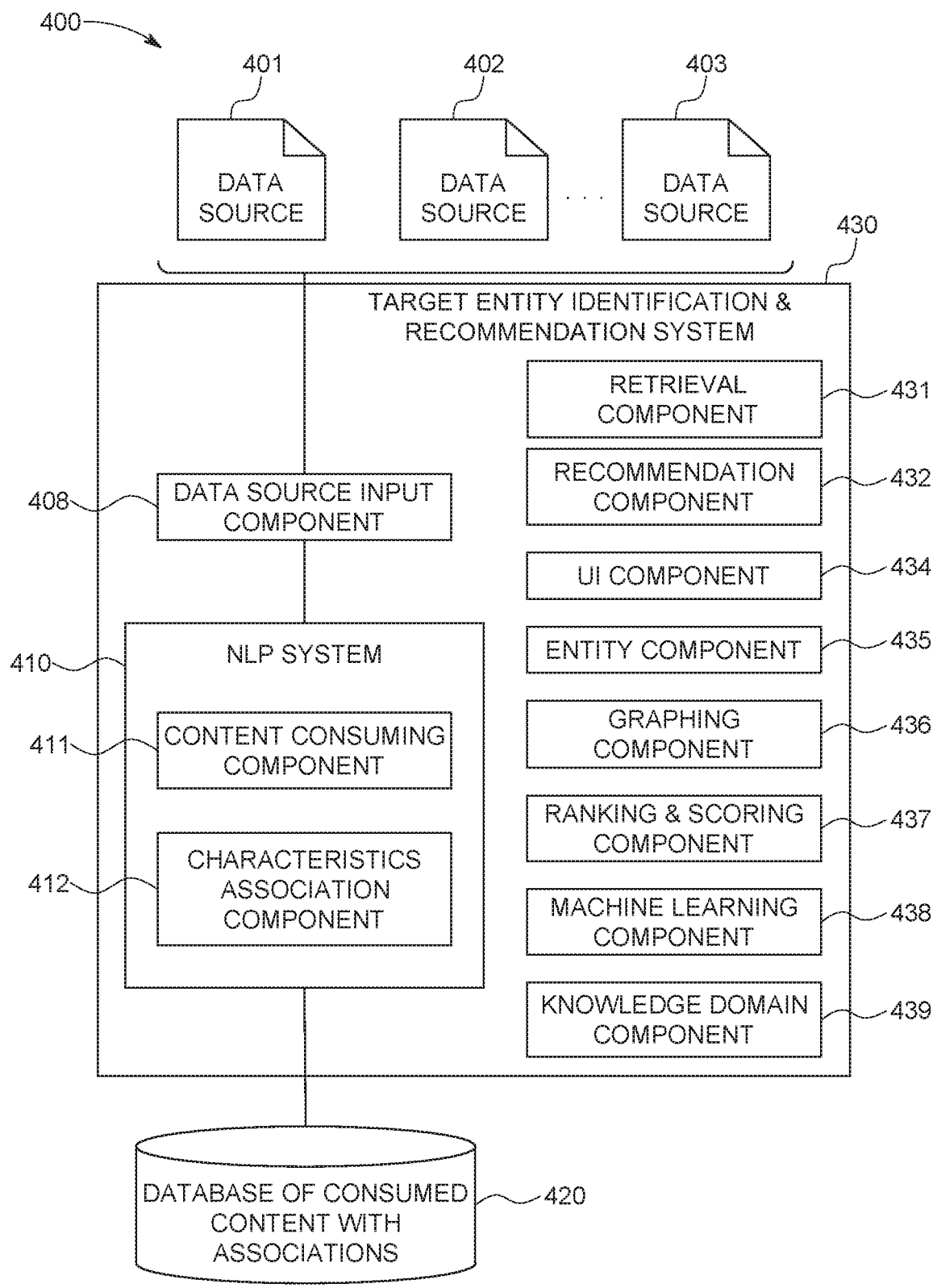
FIG. 4 is an additional block diagram depicting various user hardware and cloud computing components functioning in accordance with aspects of the present invention.

Turning now to FIG. 4, a block diagram of exemplary functionality 400 relating to white space target entity identification, evaluation, and recommendation is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for recommending predictive modeling methods and features in accordance with the present invention, such as those described in FIGS. 1-3. Many of the functional blocks 400 may execute as background processes on various components, either in distributed computing components, or on the user device, or elsewhere.

Multiple data sources 401-403 may be provided as a corpus or group of data sources defined and/or requested by a user. The data sources 401-403 may include, but are not limited to, data sources relating to one or more documents, materials related to biographies, books, scientific papers, online journals, journals, articles, newspapers, and/or other various documents or data sources capable of being published or displayed. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text based documents, other data sources such as audio, video or image sources may also be used wherein the documents may be pre-analyzed to extract their content for natural language processing, such as converting from audio to text and/or image analysis.

The group of data sources 401-403 are consumed for a target entity evaluation, identification, and recommendation system such as, for example, a target entity identification and recommendation system 430 (e.g., white space client evaluation, identification, and recommendation system) using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-403 may be analyzed by an NLP system 410 to data mine the relevant information from the content of the data sources 401-403 (e.g., methods and features extracted from mined scientific papers or documents) in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-403 as selected by using a data source input component 408, including, for example, word docs, biographies (e.g., an online resume), social media data (e.g., a post), academic or scientific papers, journals, books, online journals, wikis, web pages, power points, Internet word docs, knowledge centers, anything that the NLP system 410 knows how to understand. This may extend to non-text based documents, by providing pre-analyzing of the content such as audio to text processing.

The NLP system 410 may include a content consuming component 411 for inputting the data sources 401-403 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-403 by determining common concepts, methods, features, similar characteristics, and/or an underlying common topic. More specifically, the NLP system 410 may data mine the data sources 401-403 to identify and extract one or more entities associated features via the characteristics association component 412.

Cognition is the mental process of knowing, including aspects such as awareness, perception, reasoning and judgment. An AI system uses artificial reasoning to interpret the data sources 401-403 and extract their topics, ideas, or concepts. The learned topics and concepts such as, for example, affiliations between people or business, historical transaction data (e.g., a sales operation or sales contract), a monetary value of the transaction operation (e.g., value of the sales contract), a type of transaction, or white space target entity identification and recommendation of a domain of interest, may not be specifically named or mentioned in the data sources 401-403 and are derived by the AI interpretation.

The learned content of the data sources consumed by the NLP system may be merged into a database 420 (e.g., a structured database of processed and extracted white space target entity identification and recommendation data) or other data storage method of the consumed content with learned concepts, methods, and/or features of the data sources 401-403 providing association between the content referenced to the original data sources 401-403. For example, the database 420 may include members of a business or sales team, names of clients of a selected business, a client identifier/identification ("ID"), a client business unit, location data of a client, client business domains, opportunity business domains, products of interest to a particular entity/client, identified transaction operation opportunities (e.g., sales opportunities), outcome(s) of transaction operation opportunity including dollar value and a status of the opportunity such as, for example, success, failure, or open/available status.

In one aspect, the database 420 may be a knowledge domain. A knowledge domain component 439 may maintain, update, and provide data relating to the knowledge domain. In one aspect, the knowledge domain for the enterprise social network graph may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to organizational data (e.g., information relating to a business, organization, or governmental entity), transactional operation data, physical phenomena, environmental, scientific, industrial, educational, statistical data, and/or market data (e.g., public information such as contract prices, stock prices, salary, or product values) information. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The digital content of the original data sources 401-403 remains in the original data sources such as the wiki, web pages, etc., but the database 420 will have a logical understanding of how the original data sources 401-403 fit together using the power of the AI allowing for the concepts and therefore the associations or mappings between the data sources.

The merging of the data into one database 420 allows the target entity identification and recommendation system 430 to act like a search engine, but instead of keyword searches, it will use an AI method of making cognitive associations between the data sources using the deduced concepts.

The target entity identification and recommendation system 430 may include a user interface ("UI") component 434 (e.g., an interactive graphical user interface "GUI") providing user interaction with the indexed content for mining and navigation and/or receiving one or more inputs/queries from a user. More, specifically, the user interface component 434 may be in communication with a wireless communication device (e.g., cellular telephone 54A, desktop computer 54B, laptop computer 54C, and/or automobile computer system 54N of FIG. 2) for also providing user interaction with the indexed content relating to white space target entity identification, evaluation, and recommendation, which may be displayed in an enterprise social network graph. The wireless communication device may also include a GUI for providing a domain-oriented query functionality such as, for example, interactive GUI functionality for enabling a user to enter a query in the GUI relating to a domain of interest and an associated objective.

The target entity identification and recommendation system 430 may include a retrieval component 431 that may retrieve the one or more data sources (and indexing) and the content and characteristics of the content of the data sources (e.g., retrieving one or more articles or scientific papers that may include one or more predictive modeling methods and features). In one aspect, the retrieval component 431 may retrieve data from the structured database 420 (e.g., an offline search) and retrieve and extract additional data from the data sources (e.g., an online search) such as, for example, retrieving from an internet search engine such as, for example, biographies, news articles, or organizational employee data for a business (e.g., an "about us" section listing senior executives and board members on a company's web site).

The retrieval component 431 may provide a map index of topics or concepts (e.g., methods and/or features of one or more domains of interest) of the consumed data sources 401-403 as consumed by the NLP system mapping to the data sources 401-403. The map index may list sub-topics and hierarchies for navigation and include links or references to the original data sources 401-403.

The target entity identification and recommendation system 430 may also include a graphing component 436 (e.g., an enterprise social network graph or "Client Network"). The graphing component 436 may use data retrieved directly from one or more data sources or stored in the database 420. The graphing component 436 may work in conjunction with the retrieval component 431. Once the NLP system 410 has carried out the linking of the data, the graphing component 436, in conjunction with the retrieval component 431, may mine the associated concepts, topics, or similar characteristics from the database 420 of the consumed content to provide the most relevant sets of data sources for a topic being searched and use the associated concepts or similar characteristics.

The graphing component 436 may create an enterprise social network graph having one or more nodes relating to the collected data. The graphing component 436 may define each of the one or more nodes as representing an enterprise entity or an individual entity. The graphing component 436 may define one or more edges between the one or more nodes, wherein an edge is categorized as one of: a transaction edge representing a number of transactional operations, a number of lost opportunities to provide a transactional operation, or relationship between one or more enterprise entities and a movement edge representing movements between the individual entity and the one or more enterprise entities.

The target entity identification and recommendation system 430 may also include an entity component 435 for monitoring, tracking, and/or identifying movements, connections, or relationships between the enterprise entity and the individual entity from the text data or the knowledge domain, which may be displayed in the enterprise social network graph. The entity component 435 may identify an individual entity of the one or more potential target nodes for establishing a potential transactional operation relationship. The individual entity may be identified as having one or more movements, connections, or relationships between the selected node and the one or more potential target nodes of the enterprise social network graph.

The target entity identification and recommendation system 430 may also include a ranking and scoring component 437 for determining and/or assigning a ranking score to each node and edge. The ranking and scoring component 437 may work in conjunction with the graphing component 436 for compiling a ranked list of potential target nodes (e.g., entities identified as potential clients for establishing a transactional operation or most likely to convert to new clients as compared to other entities). The ranking and scoring component 437 may assign a score such as, for example, a connectivity score to the one or more nodes based on a number of edges connecting the enterprise entity with the individual entity such that the one or more nodes are ranked according to the connectivity score. The score may also be based upon a number of transactional operation opportunities won by an entity, a number of transactional operation opportunities lost by an entity, a monetary value of a transaction operation, a number of products provided, offered, or requested by an entity, products of an identified competitor-entity, a number of individual entities connecting to an entity, a connection sentiment, or a combination thereof. Thus, the connection score assigned to each node may reflect a connection strength between one or more nodes.

Each node may be dynamically ranked in relation to a selected node. For example, if a selected node represents "company A", the graphing component 436 may dynamical display the enterprise social network graph that ranks the nodes according to the connectivity score assigned to each node in relation to the selected node (e.g., "company A"). If a user selects an alternative node (e.g., "company B") as the selected node, the graphing component 436 may dynamically display the enterprise social network graph that ranks the nodes according to the connectivity score assigned to each node in relation to the selected node, which in the second example is company B.

In one aspect, a ranking and scoring component 437 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The target entity identification and recommendation system 430 may also include a recommendation component 432. The recommendation component 432 may recommend to a selected node one or more potential target nodes as a candidate for establishing a potential relationship according to the ranking. Said differently, the recommendation component 432 may recommend one or more target entities (potential clients) that are identified as having an opportunity for which a transactional operation (e.g., a sales contract or vendor-client relationship) may be established or secured. For example, the recommendation component 432 may recommend to a selected node ("company A") a target entity (e.g., "company B") as a potential client and opportunity to secure a sales contract or other business relationship (e.g., vendor-client) based upon company B hiring a senior executive identified as the senior executive of company C that just transferred to the same position with company B. In this case, the senior executive is identified as having a positive relationship with company A and has negotiated multiple sales contracts with company A. Thus, based upon the senior executive leaving company C and moving to the same position with company B, company B is now and identified potential client for company A.

The target entity identification and recommendation system 430 may also include a machine learning component 438. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
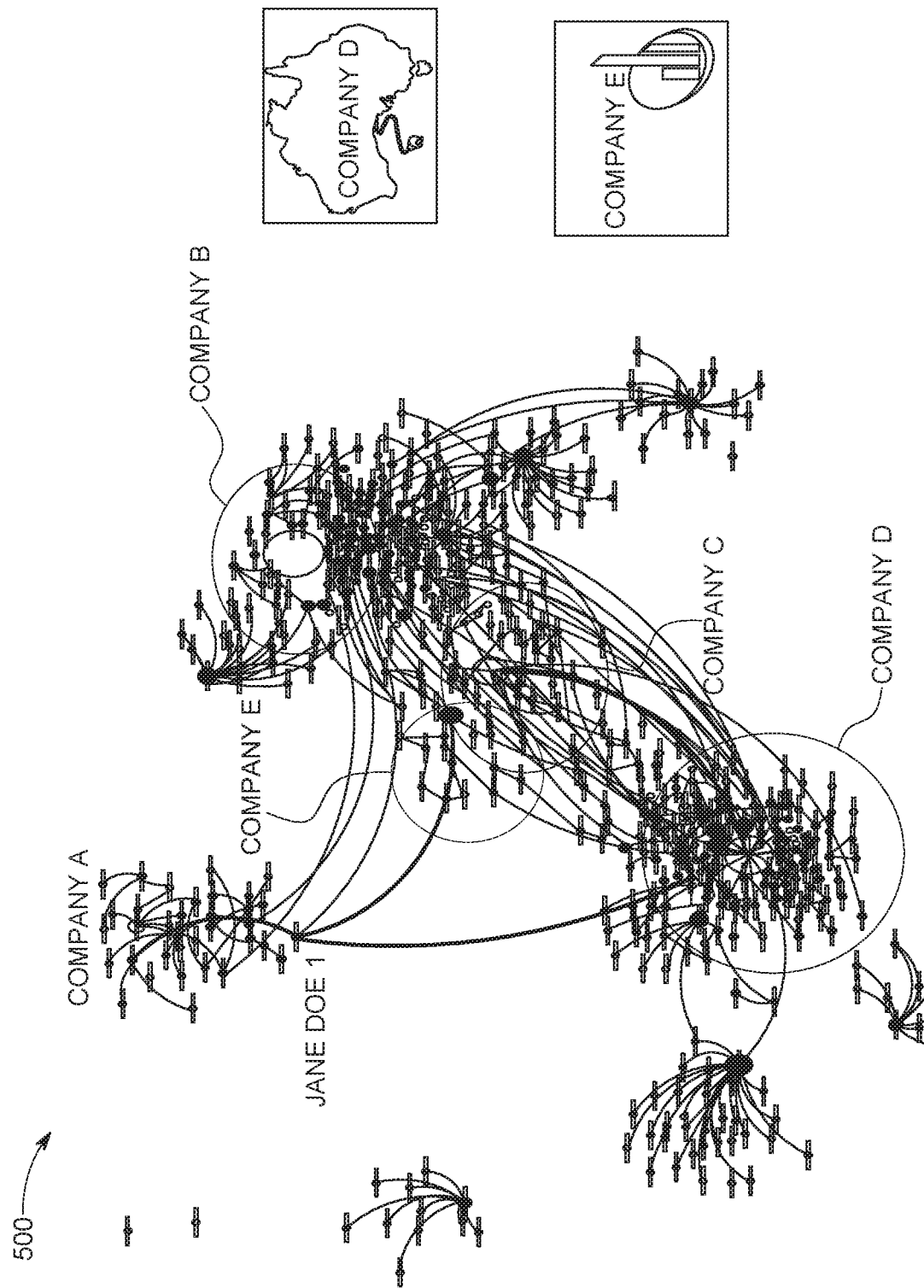
FIG. 5 is a graph diagram depicting an enterprise social network graph in which aspects of the present invention may be realized.

Consider the following example of various implementations of the aforementioned functionality as illustrated in FIG. 5. With the foregoing in mind and as a preliminary matter, the systems 500 of FIG. 5 may also be incorporated into various hardware and software components of a system for recommending predictive modeling methods and features in accordance with the present invention, such as those described in FIGS. 1-4. The systems 500 may execute as background processes on various components, either in distributed computing components, or on the user device, or elsewhere.

As shown, graph 500 is an enterprise social network graph. Using data collected from a database and/or knowledge domain relating to a plurality of entities and/or text data extracted from one or more data sources, the enterprise social network graph 500 may be created having one or more nodes relating to the collected data. For example, each node may represent a variety of entities such as, for example, business leaders, managers, sales representatives, executives, employees, and companies. The enterprise social network graph 500 may also include nodes such as products previously purchased, business category, and internal employees who previously worked with the clients. For example, as illustrated in enterprise social network graph 500, company A, company B, company C, company D, and company E are depicted as "nodes". The enterprise social network graph 500 may identify how each node such as, for example, company A, company B, company C, company D, and company E each relate to each other or to a selected node. For example, the enterprise social network graph 500 may illustrate how each node (such as company B and company C in FIG. 5) directly or indirectly relate to the selected node, such as, company A. For example, the enterprise social network graph 500 illustrates that company A has a relationship with company B and company C. The relationship may be a previous or current business (e.g., sales transaction), partnership, or an employee that may have a positive relationship (e.g., a senior executive of company B has previously awarded company A a sales contract for the purchase of one or more goods and services such as through an individual entity "Jane Doe 1").

Figure 6:
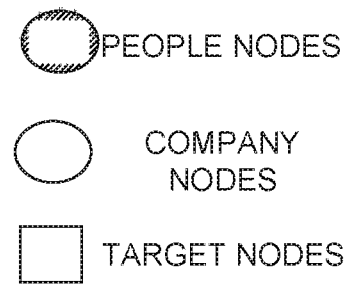
FIG. 6 is an additional block diagram depicting an exemplary functional relationship between various aspects of the present invention.
Figure 6:
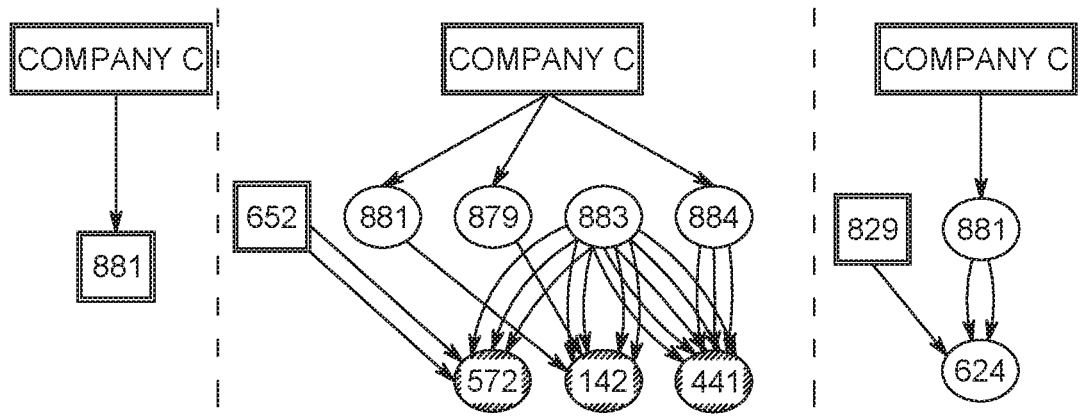

Turning now to FIG. 6, an additional block diagram depicts an exemplary functional relationship such as, for example, ranking connectivity between nodes of the enterprise social network graph 500. Having created the enterprise social network graph 500 of FIG. 5, each of the nodes in the enterprise social network graph may be ranked. In one aspect, a connectivity score may first be assigned to each of the nodes based on a number of edges connecting one or more alternative nodes (e.g., an enterprise entity of a first node with the individual entity of a second node) such that each of the nodes are ranked according to the connectivity score. Each node may also be connected to sub-nodes or alternative nodes. For example, the enterprise social network graph 500 of FIG. 5 may show a number of connections, movements, or relationships of one or more nodes and sub-nodes.

Consider the following example to illustrate the ranking of the enterprise social network graph 500. Assume, for example, company B is using the enterprise social network graph 500. Company A is trying to identify one or more potential target nodes for establishing a business relationship (e.g., sales transaction, sales/lease contract, etc.). The enterprise social network graph 500 may dynamically rank each node in relation to the selected node, company C. Using a database, which may include a selected table of data such as, for example, table 1 of FIG. 6, the enterprise social network graph 500 is ranked according to corresponding data of Table 1, which may be acquired from one or more data sources and/or database/knowledge domain. For example, company E may be assigned a company ID of 879, a connection score (in relation to the selected node of Company C) of 0.0179, and a rank of 19. Company D may be assigned a company ID of 881, a connection score (in relation to the selected node of Company C) of 0.0179, and a rank of 20. Company A may be assigned a company ID of 652, a connection score (in relation to the selected node of Company C) of 0.000020, and a rank of 754. Company F may be assigned a company ID of 829, a connection score (in relation to the selected node of Company C) of 0.000015, and a rank of 829. As illustrated in the enterprise social network graph connected to Table 1 of FIG. 6, Company C is shown with each of the various connections between company nodes, target nodes, and individual entity nodes. Thus, the enterprise social network graph may be used to recommend to a selected node (e.g., company C) one or more potential target nodes (e.g., nodes 881, 652, and 829) as a candidate node for establishing a potential transaction operation relationship according to the ranking. In one aspect, those nodes having a lower ranking score, as compared to those nodes having a higher ranking score, may be considered as a node that has a higher likelihood (e.g., percentage greater than 50%) or potential for establishing a business relationship between the target node and a selected node. Thus, in relation to the selected node (company C), company E as a greater chance/opportunity (ranking of 19) for establishing the business relationship with company C as compared to company A having a ranking of 754.

Figure 7A:
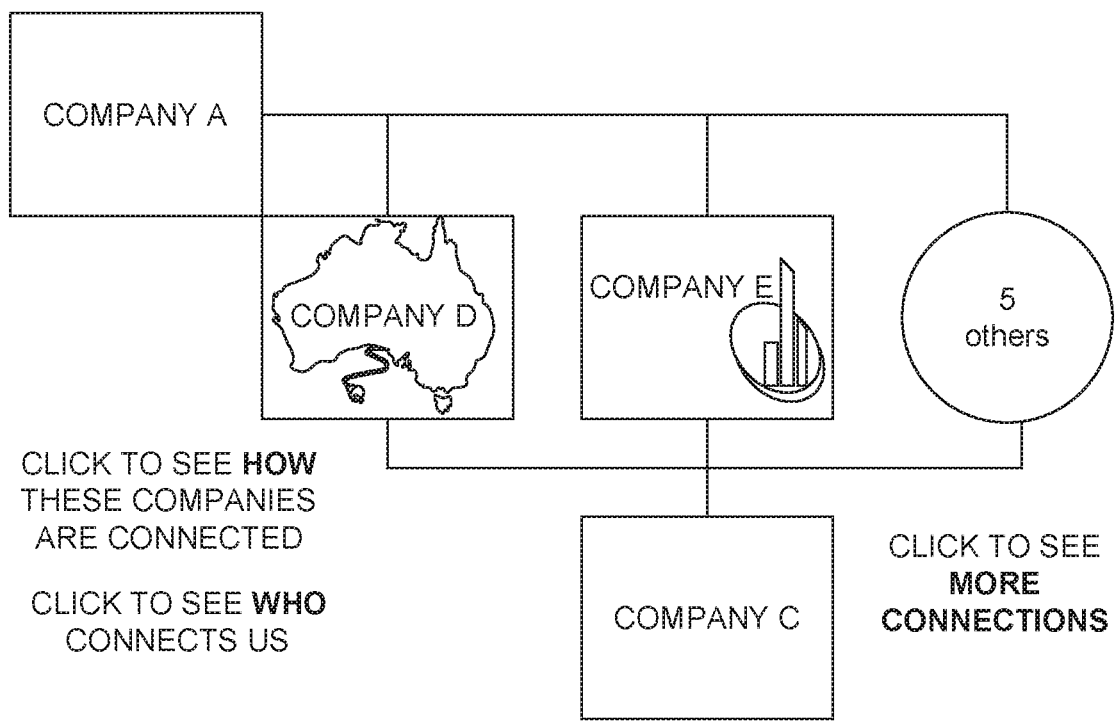
FIGS. 7A-7C are diagrams depicting an exemplary functional relationship between various aspects of the present invention.
Figure 7B:
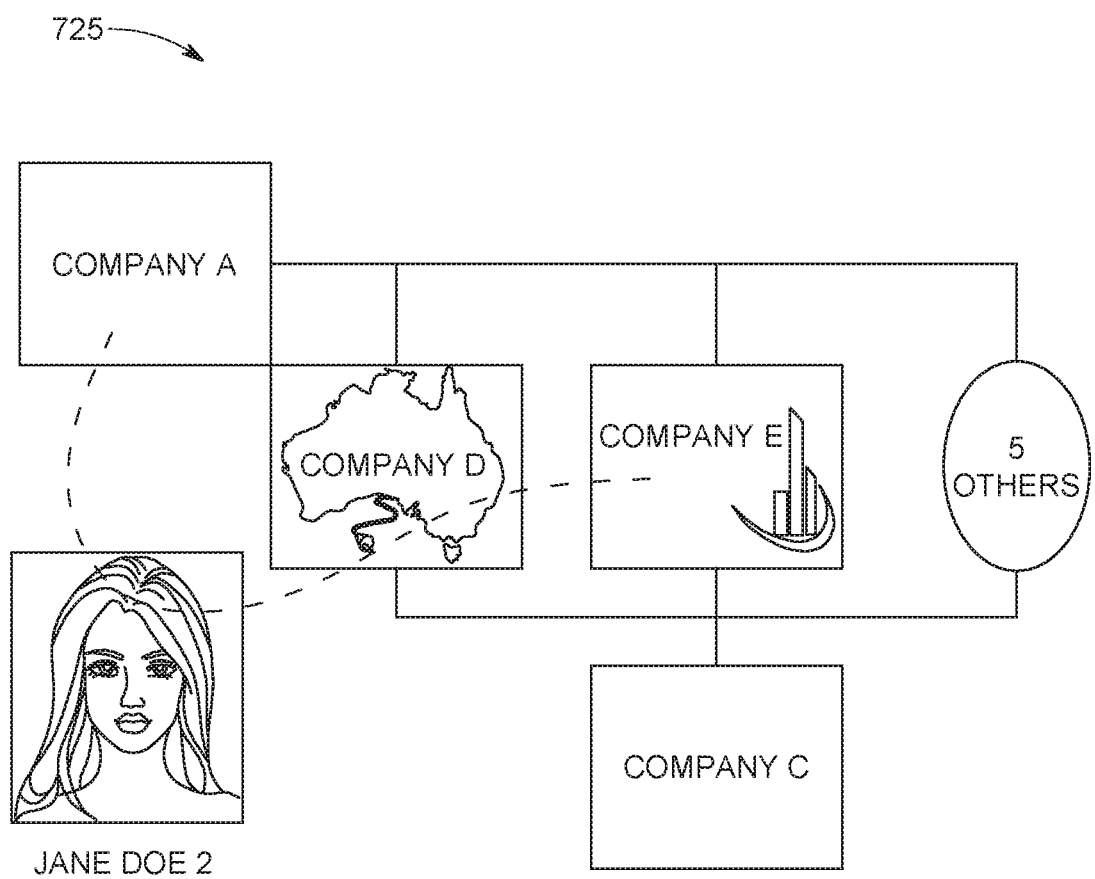
Figure 7C:
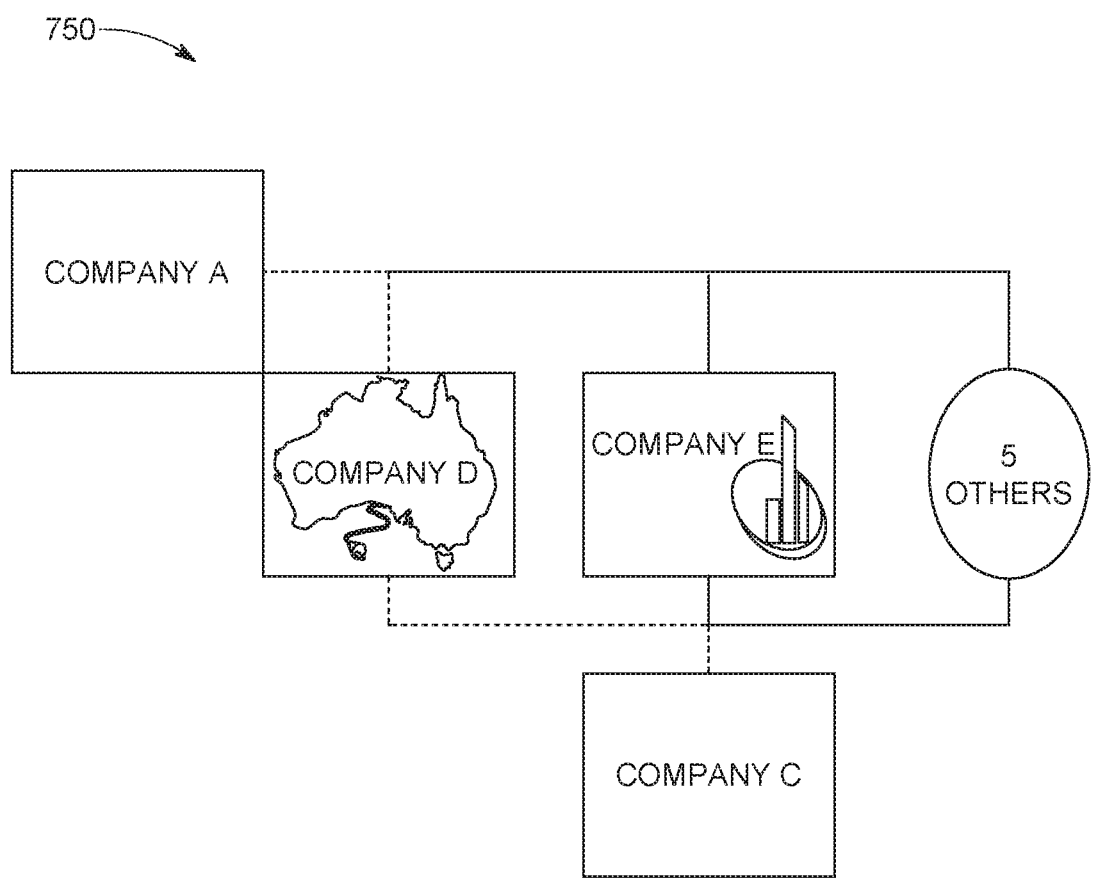

Turning now to FIGS. 7A-7C are diagrams depicting various uses of an enterprise social network graph. For example, FIG. 7A identifies one or more target entities/nodes for creating or maintaining a business relationship based on enriched marketing data. That is, FIG. 7A illustrates the various connections between a selected company such as, for example company C and a target entity such as, for example, company A. The connections between company C and company A indicated 7 total connections or companies such as, for example, company D, company E, and five other entities.

In one aspect, opportunity metrics may be used based on a connection probability (e.g., a connection score being assigned 83) between the selected node (e.g., company C) of an enterprise social network graph and a target node (e.g., company A). The increase of 7 new nodes (e.g., companies) may cause an increase in connectivity between the selected node (e.g., company C) and the target node (e.g., company A). The enterprise social network graph 700 may also provide interactive GUI interfaces/buttons (e.g., "click to see more connections", "click to see how these companies are connected", and/or "click to see who connects to us") to enable a user to drill into the enterprise social network graph to identify and observe one or more connections.

Continuing on with the selected node (e.g., company C) and the target node (e.g., company A) example, enterprise social network graph 725 may identify that one or more nodes (e.g., company A and company C) may be connected to each other via organizations and persons working for company C's current and/or historical clients. For example, company A may be connected to company C via Jane Doe 2 who was employed with company E and now is employed at company A.

As illustrated in enterprise social network graph 750, a connection strength between the selected node (e.g., company C) and target node (e.g., company A) may be measured through a networks' edge values. For example, one or more edges between the one or more nodes may be defined. Also, an edge is categorized as one of: a transaction edge representing a number of transactional operations, a number of lost opportunities to provide a transactional operation, or relationship between one or more enterprise entities and a movement edge representing movements between the individual entity and the one or more enterprise entities. Historical edge values may depict a number of opportunities such as, for example, a number of opportunities (e.g., business contracts, purchase of goods/services, etc.) won, number of opportunities (e.g., business contracts, purchase of goods/services, etc.) lost, a monetary value of the sales contract or purchase of goods/services, a number and type of goods and services, and competitor entity's goods or services. The edges of the enterprise social network graph 750 may also be a social graph edge with a value representing a number of people or entities connecting other people or entities and a connection sentiment.

Figure 8A:
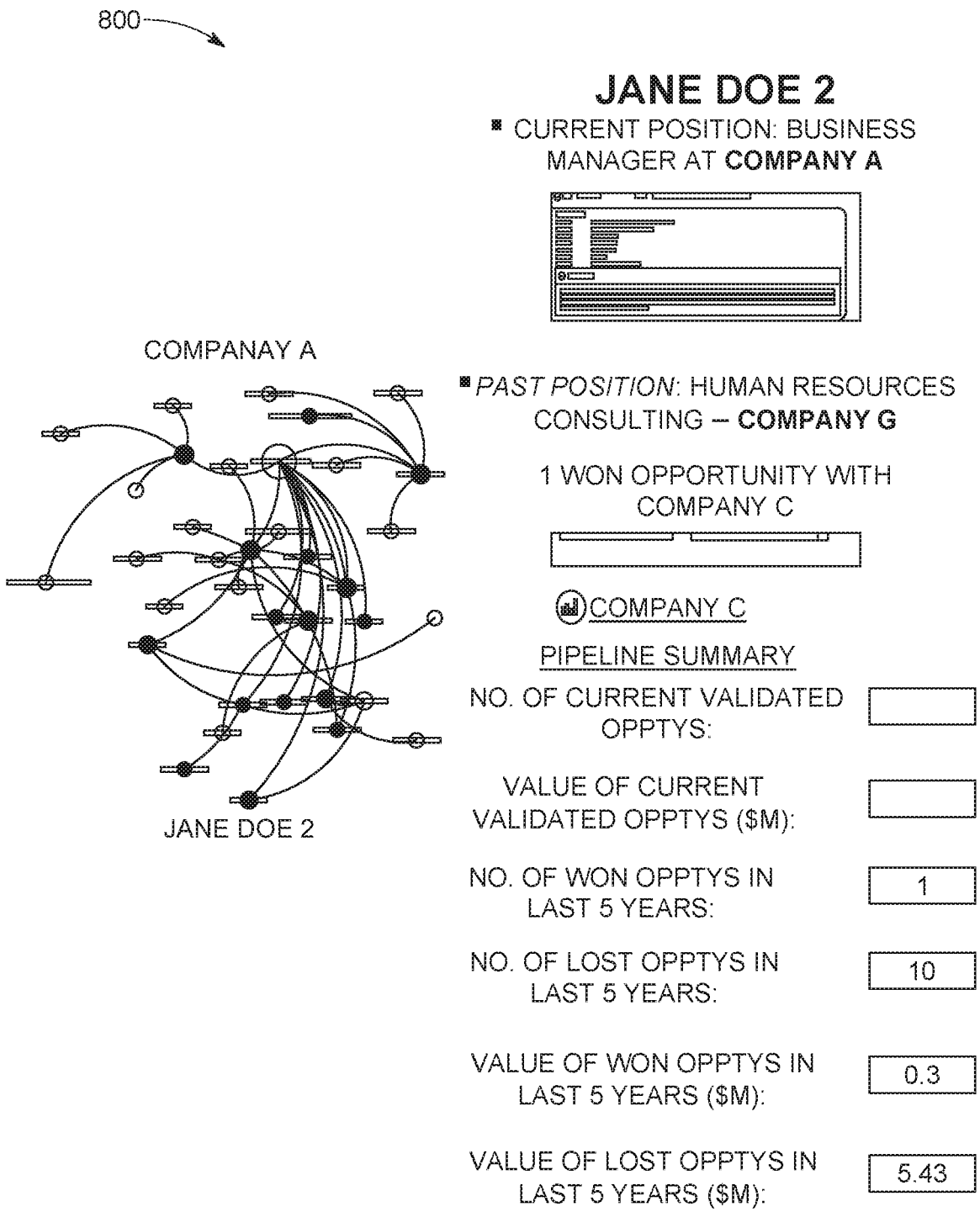

Turning now to FIGS. 8A-8B, diagrams 800, 825 depict additional uses of an enterprise social network graph. The enterprise social network graph 500 of FIG. 5 may be incorporated into FIGS. 8A-8B using various hardware and software components of a system, such as those described in FIGS. 1-7A-7B. In one aspect, an enterprise social network graph 800 may be a client network that may indicate how one or more targeted persons within a targeted entity (e.g., a company or organization of interest) are connected to a selected node (e.g., a selected company). For example, the enterprise social network graph 800 may indicate that "Jane Doe 2" is a business manager at a target node (e.g., company A). The enterprise social network graph 800 indicates that Jane Doe 2 held a previous position ("past position") of human resources consulting for node G (e.g., company G). A pipeline summary of Jane Doe 2 may also be provided to indicate previous movements, connections, or relations to the selected node (e.g., company C). For example, the pipeline summary may indicate that a number of opportunities (e.g., business opportunities) won in the last 5 years by company A with Jane Doe 2 is "1" and a number of opportunities (e.g., business opportunities) lost in the last 5 years by company A with Jane Doe 2 is "10". The pipeline summary generated by the enterprise social network graph 800 may also indicate that the value of the business opportunity that was previously won is $0.3 million dollars and the value of the business opportunity that was previously lost is $5.43 million dollars.

In one aspect, an enterprise social network graph 825 of FIG. 8B may also connect one or more targeted individual entities (e.g., a business leader, senior executive, etc.) or enterprise entities (e.g., business, organization, etc.) within a targeted entity (e.g., a company or organization of interest) to a selected node (e.g., a selected company such as, for example, Company C). For example, the enterprise social network graph 825 may indicate that "Jane Doe 1" is a board director at a target node (e.g., company A). More specifically, the enterprise social network graph 825 may extract movements (e.g., changing jobs between companies), connections (e.g., sales contracts, etc.), or relationships between the selected entity and a targeted entity such as, for example, an individual entity from the text data or the knowledge domain. For example, the enterprise social network graph 825 may extract text data from a news release, biography, or other document or report indicating that Jane Doe 1 recently joined company A as a board director such as, for example, extracting text from the news release indicating that Jane Doe 1 has over 25 years experience in executive management.

The enterprise social network graph 825 may also indicate that Jane Doe 1 held a previous position ("past position") of chief executive officer ("CEO") for a node (e.g., company E). A pipeline summary of Jane Doe 1 working as CEO of company E may also indicate that a number of opportunities (e.g., business opportunities) won in the last 5 years by company E with Jane Doe 1 is "4" and a number of opportunities (e.g., business opportunities) lost in the last 5 years by company E with Jane Doe 1 is "18". The pipeline summary generated by the enterprise social network graph 825 may also indicate that the value of the business opportunity that was previously won is $0.21 million dollars and the value of the business opportunity that was previously lost is $0.53 million dollars.

The enterprise social network graph 825 may also indicate that Jane Doe 1 held a previous position ("past position") of senior manager for a node (e.g., company D). A pipeline summary of Jane Doe 1 working as senior manager of company D may also indicate that a number of current validated opportunities is 163 and the value of the current validated opportunities is $178.73 million dollars. In one aspect, validated means that the mechanisms of the illustrated embodiments have (1) validated an understanding of a client's business issues and priorities and compelling reasons to act; (2) completed a client growth strategic plan with relationship planning or mapping, set up an account, and/or achieved one or more discussions and action plans are achieved or being achieved; (3) set an initial opportunity plan; and/or (4) engaged a potential client decision leader/team.

The pipeline summary of Jane Doe 1 working as senior manager of company D may also indicate that a number of opportunities (e.g., business opportunities) won in the last 5 years by company D with Jane Doe 1 is "2310" and a number of opportunities (e.g., business opportunities) lost in the last 5 years by company D with Jane Doe 1 is "2367". The pipeline summary generated by the enterprise social network graph 825 may also indicate that the value of the business opportunity that was previously won is $1639.31 million dollars and the value of the business opportunity that was previously lost is $2876.37 million dollars.

Figure 9:
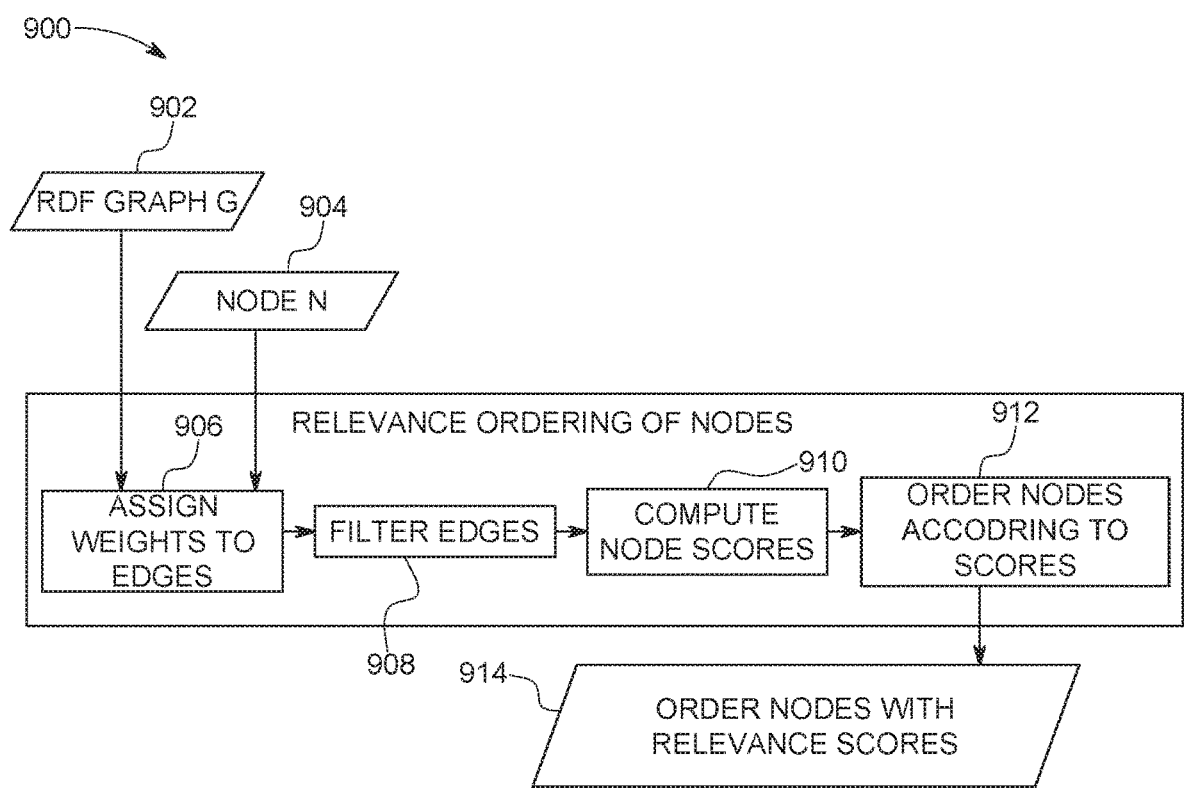
FIG. 9 is a flowchart diagram of an exemplary method for identifying and evaluating white space target entities for transaction operations by a processor, in which various aspects of the present invention may be realized.

Consider the following example of various implementations of the aforementioned functionality as illustrated in FIG. 9. With the foregoing in mind and as a preliminary matter, the systems 900 of FIG. 9 may also be incorporated into various hardware and software components of a system for recommending predictive modeling methods and features in accordance with the present invention, such as those described in FIGS. 1-8B. The system 900 may execute as background processes on various components, either in distributed computing components, or on the user device, or elsewhere.

As shown, the various blocks of functionality are depicted with arrows designating the blocks' 900 relationships with each other and to show process flow. Additionally, descriptive information is also seen relating each of the functional blocks 900. As will be seen, many of the functional blocks may also be considered "modules" of functionality, in the same descriptive sense as has been previously described in FIG. 1-4. Many of the functional blocks 900 may execute as background processes on various components, either in distributed computing components, or on the user device, or elsewhere, and generally unaware to the user performing generalized tasks.

As a preliminary matter, blocks 900 illustrate node relevance analysis and node path prediction. Accordingly, the nodes may be ranked in an enterprise social network graph according to the node's relevance (e.g., movements, connections, relationships, etc.) to a selected, starting node. A subset of nodes may be identified that are relevant to the selected, starting node. A graph analysis operation may be used so as to capture remote locations/nodes in the graph. The graph analysis operation may also rely on the structure of the graph and may be agnostic to semantic knowledge (e.g., agnostic to contents of the nodes or edges (but may be used on top of the graph analysis operation if selected)). That is, agnostic to semantic knowledge means that the analysis can be based only on the structure of the graph and structure means information about what nodes are connected to each other through edges. Using semantic analysis on top of the graph analysis means that the mechanisms of the illustrated embodiments may optionally use additional information in the analysis. For example, nodes and edges may have a type and edges may have a weight, etc.

Historical data of a selected node may be used to train a prediction model so as to provide a degree of confidence or "confidence value" that indicates the chances (such as using a percentage, a range of values, or a threshold value) that a target node may become a "client" or result in an opportunity to win a business transaction operation (e.g., a sales or purchase contract).

Using the foregoing detailed operations, starting with blocks 902 and 904, a graph such as, for example, RDF graph "G" having "N" number of nodes may be used to assign weights to the edges of the node "N", as in block 906, where "N" may be a positive integer or a defined value. The node edges may be filtered, as in block 908. A connectivity score may be calculated or determined based on a number of edges connecting one or more nodes to a selected node, as in block 910. The nodes may be ordered such as, for example, according to a decreasing connectivity score, as in block 912. The nodes may also be ordered according to the relevancy of the scores (e.g., decreasingly ordered scores), as in block 914. That is, after computing a score for each node, the nodes may be ranked in a decreasing order of the scores of each node.

In one aspect, each of the blocks 902-914 for the graph analysis operation may employ one or more aspects as described in detail in U.S. Patent Application US20160117413A1 (U.S. Ser. No. 14/520,741), which may be incorporated herein by reference.

Figure 10:
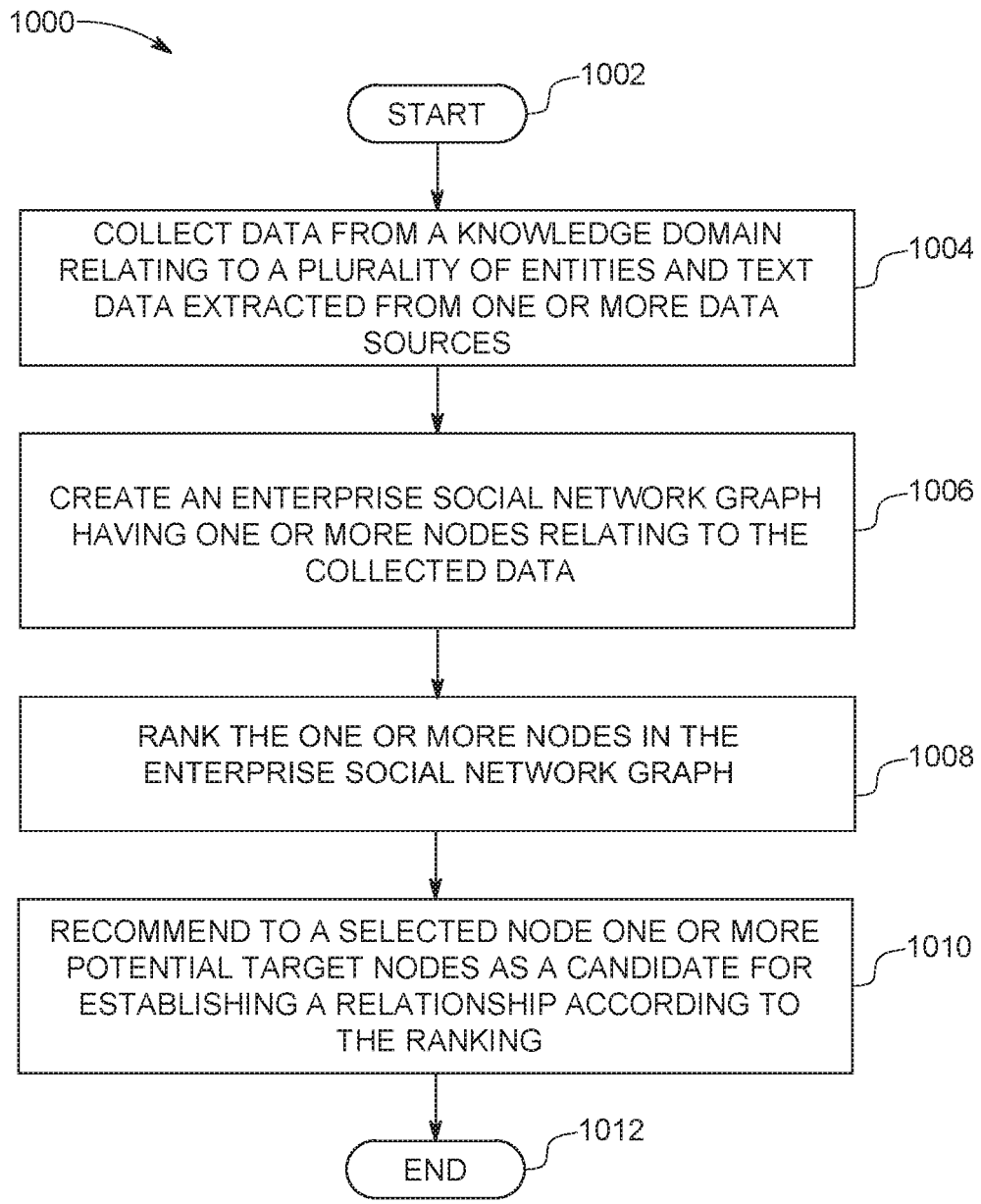
FIG. 10 is a flowchart diagram for identifying and evaluating white space target entities for transaction operations by a processor, in which various aspects of the illustrated embodiments may be implemented.

FIG. 10 is an additional method 1000 for identifying and evaluating white space target entities for transaction operations by a processor, in which various aspects of the illustrated embodiments may be implemented. The functionality 1000 may be implemented as a method executed as instructions on a machine, where the instructions are included on at least one computer readable storage medium or one non-transitory machine-readable storage medium. The functionality 1000 may start in block 1002. Data may be collected from a knowledge domain relating to a plurality of entities (e.g., a business, organization, targeted employees, etc.) and text data extracted from one or more data sources, as in block 1004. An enterprise social network graph may be created having one or more nodes relating to the collected data, as in block 1006. The one or more nodes in the enterprise social network graph may be ranked, as in block 1008. One or more potential target nodes may be recommended to a selected node as a candidate for establishing a relationship (e.g., positive or favorable relationship leading to a sales transaction or operation) according to the ranking, as in block 1010. The functionality 1000 may end in block 1012.

In one aspect, in conjunction with and/or as part of at least one block of FIG. 10, the operations of method 1000 may include each of the following. The operations of method 1000 may include defining or classifying each of the one or more nodes as representing an enterprise entity (e.g., a business or organization) or an individual entity (e.g., a person such as a senior executive, a board member, or targeted employee of an enterprise entity). Movements, connections, or relationships between the enterprise entity and the individual entity may be extracted from the text data or the knowledge domain.

The operations of method 1000 may include defining or classifying one or more edges between the one or more nodes, wherein an edge is categorized as one of: a transaction edge representing a number of transactional operations, a number of lost opportunities to provide a transactional operation, or relationship between one or more enterprise entities and a movement edge representing movements between the individual entity and the one or more enterprise entities. A connectivity score may be assigned to the one or more nodes based on a number of edges connecting the enterprise entity with the individual entity such that the one or more nodes are ranked according to the connectivity score. An individual entity of the one or more potential target nodes may be tracked or identified for establishing a potential transactional operation relationship. The individual entity may have one or more movements, connections, or relationships between the selected node and the one or more potential target nodes.

The operations of method 1000 may include recommending one or more goods or services to the selected node based on the transactional operation relationship. The data sources may include at least news articles, publications, journals, biographies, social media data, and books.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for recommending target entities, comprising:

collecting, by a processor, data from a knowledge domain relating to a plurality of enterprise entities and text data extracted from one or more data sources;

creating, by the processor, an enterprise social network graph having one or more nodes relating to the collected data, wherein each node of the one or more nodes represents an enterprise entity or an individual entity;

defining, by the processor, a plurality of edges between the one or more nodes according to information parsed from the collected data of the knowledge domain and the text data extracted from the one or more data sources notwithstanding whether the collected data and the text data were originally created for an operation of generating the enterprise social network graph, wherein the plurality of the edges are categorized, respectively, as a transaction edge and a movement edge, wherein the transaction edge is defined from a group comprising of a number of transactional operations secured previously by the enterprise entity or the individual entity, a number of lost opportunities facilitated by the enterprise entity or the individual entity to provide a transactional operation, a business relationship between one or more enterprise entities, and a business relationship between the enterprise entity and the individual entity, and wherein the movement edge represents employment position movements of the individual entity vertically within the one or more enterprise entities and horizontally between at least two of the one or more enterprise entities;

ranking, by the processor, the one or more nodes in the enterprise social network graph according to a combination of the plurality of the edges between the one or more nodes;

recommending, by the processor, to a selected node one or more potential target nodes as a candidate for establishing a potential relationship according to the ranking;

assigning, by the processor, a connectivity score to the one or more nodes based on a number of the edges connecting the enterprise entity with the individual entity such that the one or more nodes are ranked according to the connectivity score, wherein the individual entity is a board member or executive employee of the one or more enterprise entities; and identifying, by the processor, the individual entity of the one or more potential target nodes for establishing a potential transactional operation relationship, wherein the individual entity has one or more movements, connections, or relationships between the selected node and the one or more potential target nodes.

2. The method of claim 1, further including extracting the employment position movements, connections, or relationships between the enterprise entity and the individual entity from the text data or the knowledge domain.

3. The method of claim 1, further including recommending one or more goods or services to the selected node based on the transactional operation relationship, wherein the one or more data sources include at least news articles, publications, journals, biographies, social media data, and books.

4. A system for evaluating white space target entities, comprising:

one or more computers having at least one processor and executable instructions that when executed cause the system to:

collect data from a knowledge domain relating to a plurality of enterprise entities and text data extracted from one or more data sources;

create an enterprise social network graph having one or more nodes relating to the collected data, wherein each node of the one or more nodes represents an enterprise entity or an individual entity;

define a plurality of edges between the one or more nodes according to information parsed from the collected data of the knowledge domain and the text data extracted from the one or more data sources notwithstanding whether the collected data and the text data were originally created for an operation of generating the enterprise social network graph, wherein the plurality of the edges are categorized, respectively, as a transaction edge and a movement edge, wherein the transaction edge is defined from a group comprising of a number of transactional operations secured previously by the enterprise entity or the individual entity, a number of lost opportunities facilitated by the enterprise entity or the individual entity to provide a transactional operation, a business relationship between one or more enterprise entities, and a business relationship between the enterprise entity and the individual entity, and wherein the movement edge represents employment position movements of the individual entity vertically within the one or more enterprise entities and horizontally between at least two of the one or more enterprise entities;

rank the one or more nodes in the enterprise social network graph according to a combination of the plurality of the edges between the one or more nodes;

recommend to a selected node one or more potential target nodes as a candidate for establishing a potential relationship according to the ranking;

assign a connectivity score to the one or more nodes based on a number of the edges connecting the enterprise entity with the individual entity such that the one or more nodes are ranked according to the connectivity score, wherein the individual entity is a board member or executive employee of the one or more enterprise entities; and identify the individual entity of the one or more potential target nodes for establishing a potential transactional operation relationship, wherein the individual entity has one or more movements, connections, or relationships between the selected node and the one or more potential target nodes.

5. The system of claim 4, wherein the executable instructions further extract the employment position movements, connections, or relationships between the enterprise entity and the individual entity from the text data or the knowledge domain.

6. The system of claim 4, wherein the executable instructions further recommend one or more goods or services to the selected node based on the transactional operation relationship, wherein the one or more data sources include at least news articles, publications, journals, biographies, social media data, and books.

7. A computer program product for evaluating white space target entities by a processor, the computer program product comprising a non-transitory computer-readable storage medium having computer-readable program code portions stored therein, the computer-readable program code portions comprising:

an executable portion that collects data from a knowledge domain relating to a plurality of enterprise entities and text data extracted from one or more data sources;

an executable portion that creates an enterprise social network graph having one or more nodes relating to the collected data, wherein each node of the one or more nodes represents an enterprise entity or an individual entity;

an executable portion that defines a plurality of edges between the one or more nodes according to information parsed from the collected data of the knowledge domain and the text data extracted from the one or more data sources notwithstanding whether the collected data and the text data were originally created for an operation of generating the enterprise social network graph, wherein the plurality of the edges are categorized, respectively, as a transaction edge and a movement edge, wherein the transaction edge is defined from a group comprising of a number of transactional operations secured previously by the enterprise entity or the individual entity, a number of lost opportunities facilitated by the enterprise entity or the individual entity to provide a transactional operation, a business relationship between one or more enterprise entities, and a business relationship between the enterprise entity and the individual entity, and wherein the movement edge represents employment position movements of the individual entity vertically within the one or more enterprise entities and horizontally between at least two of the one or more enterprise entities;

an executable portion that ranks the one or more nodes in the enterprise social network graph according to a combination of the plurality of the edges between the one or more nodes;

an executable portion that recommends to a selected node one or more potential target nodes as a candidate for establishing a potential relationship according to the ranking;

an executable portion that assigns a connectivity score to the one or more nodes based on a number of the edges connecting the enterprise entity with the individual entity such that the one or more nodes are ranked according to the connectivity score, wherein the individual entity is a board member or executive employee of the one or more enterprise entities; and an executable portion that identifies the individual entity of the one or more potential target nodes for establishing a potential transactional operation relationship, wherein the individual entity has one or more movements, connections, or relationships between the selected node and the one or more potential target nodes.

8. The computer program product of claim 7, further including an executable portion that extracts the employee position movements, connections, or relationships between the enterprise entity and the individual entity from the text data or the knowledge domain.

9. The computer program product of claim 7, further including an executable portion that recommends one or more goods or services to the selected node based on the transactional operation relationship, wherein the one or more data sources include at least news articles, publications, journals, biographies, social media data, and books.

* * * * *